C. JOHNSON & C. FRANK.
MANURE SPREADER.
APPLICATION FILED MAY 31, 1911.
1,011,624.
Patented Dec. 12, 1911.
5 SHEETS—SHEET 1.
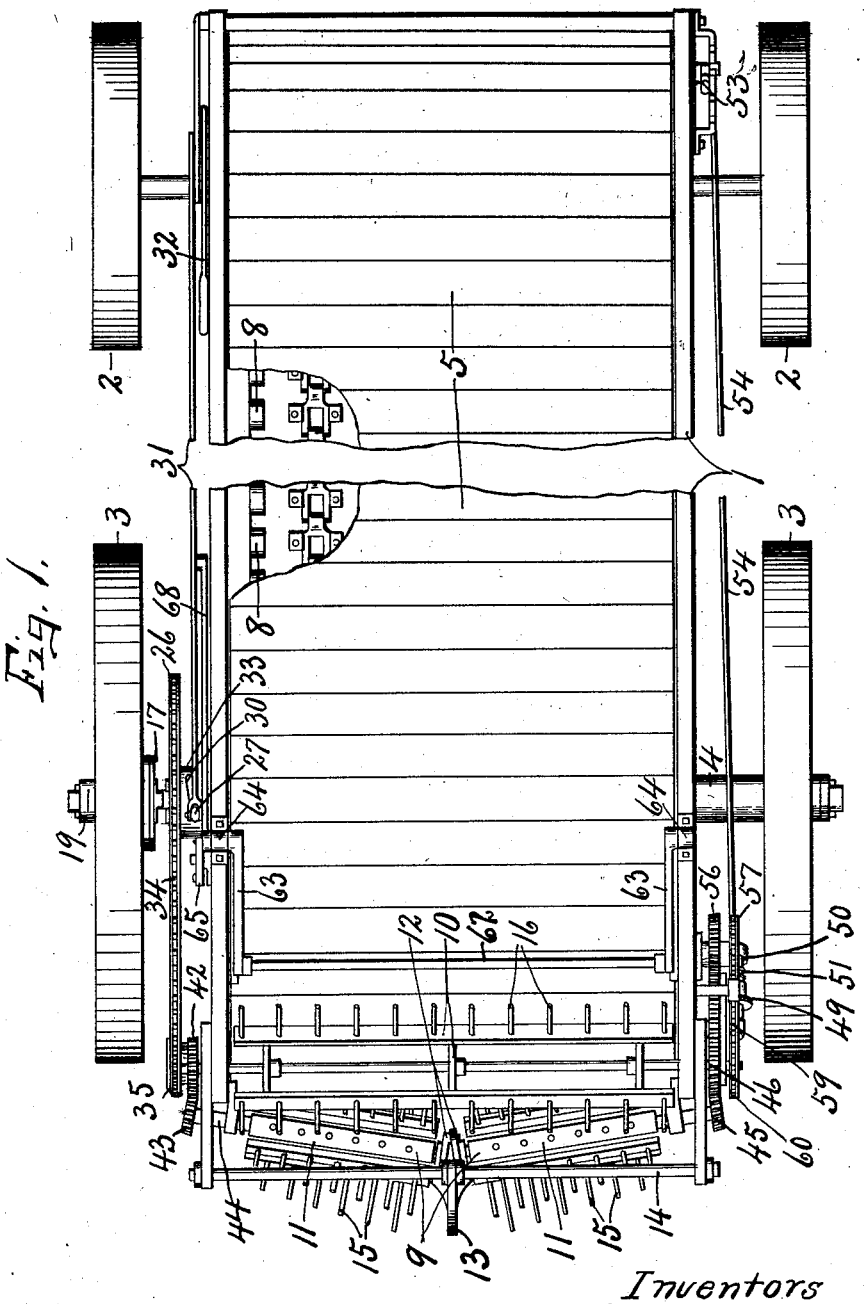
Witnesses.
Chas. E. Skelton.
H. E. Chas.
Inventors
C. Frank and
C. Johnson
By Howard P. Denison
Atty.

C. JOHNSON & C. FRANK.
MANURE SPREADER.
APPLICATION FILED MAY 31, 1911.
1,011,624.
Patented Dec. 12, 1911.
5 SHEETS—SHEET 2.
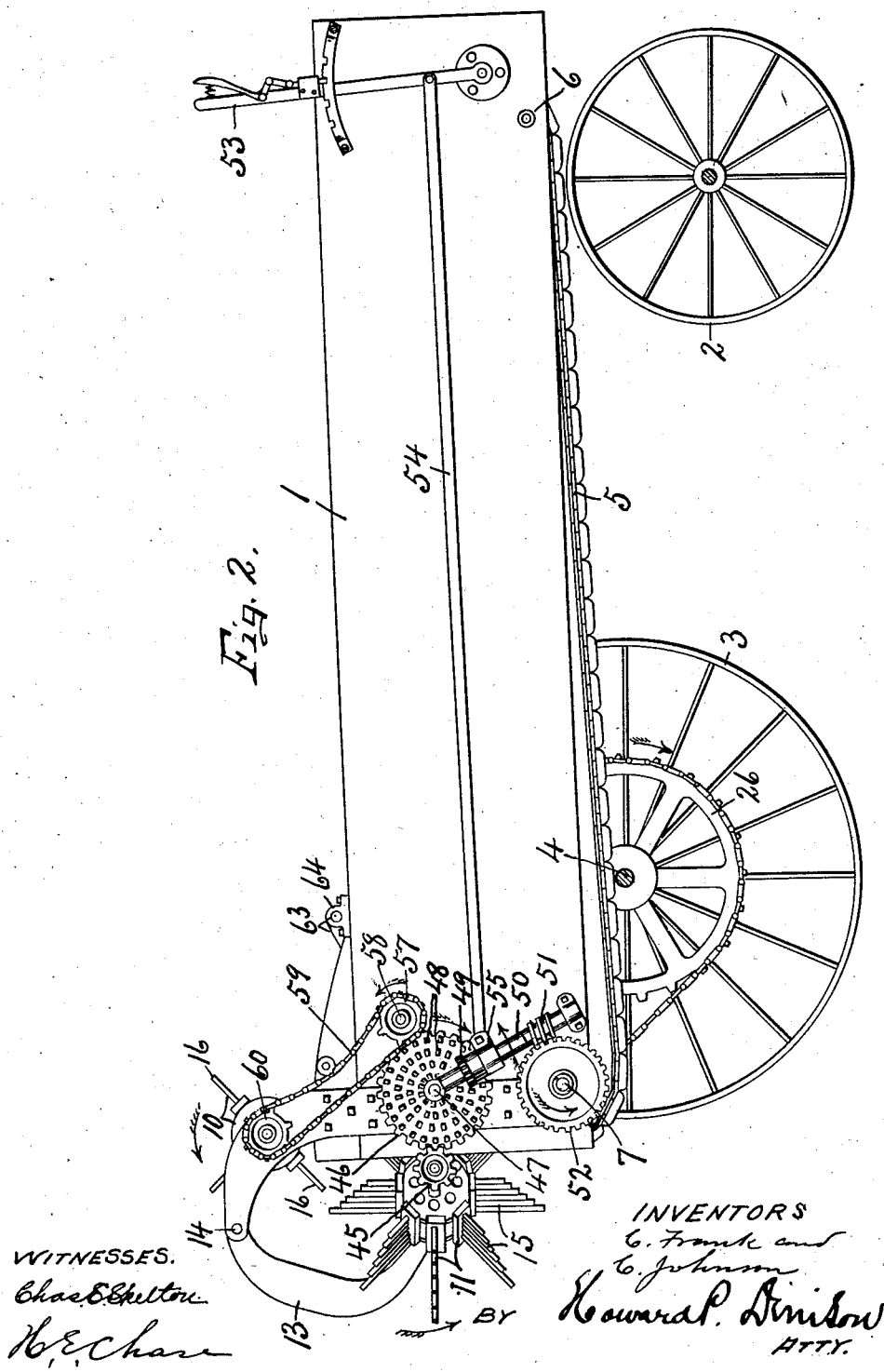

C. JOHNSON & C. FRANK.
MANURE SPREADER.
APPLICATION FILED MAY 31, 1911.
1,011,624.
Patented Dec. 12, 1911.
5 SHEETS—SHEET 3.
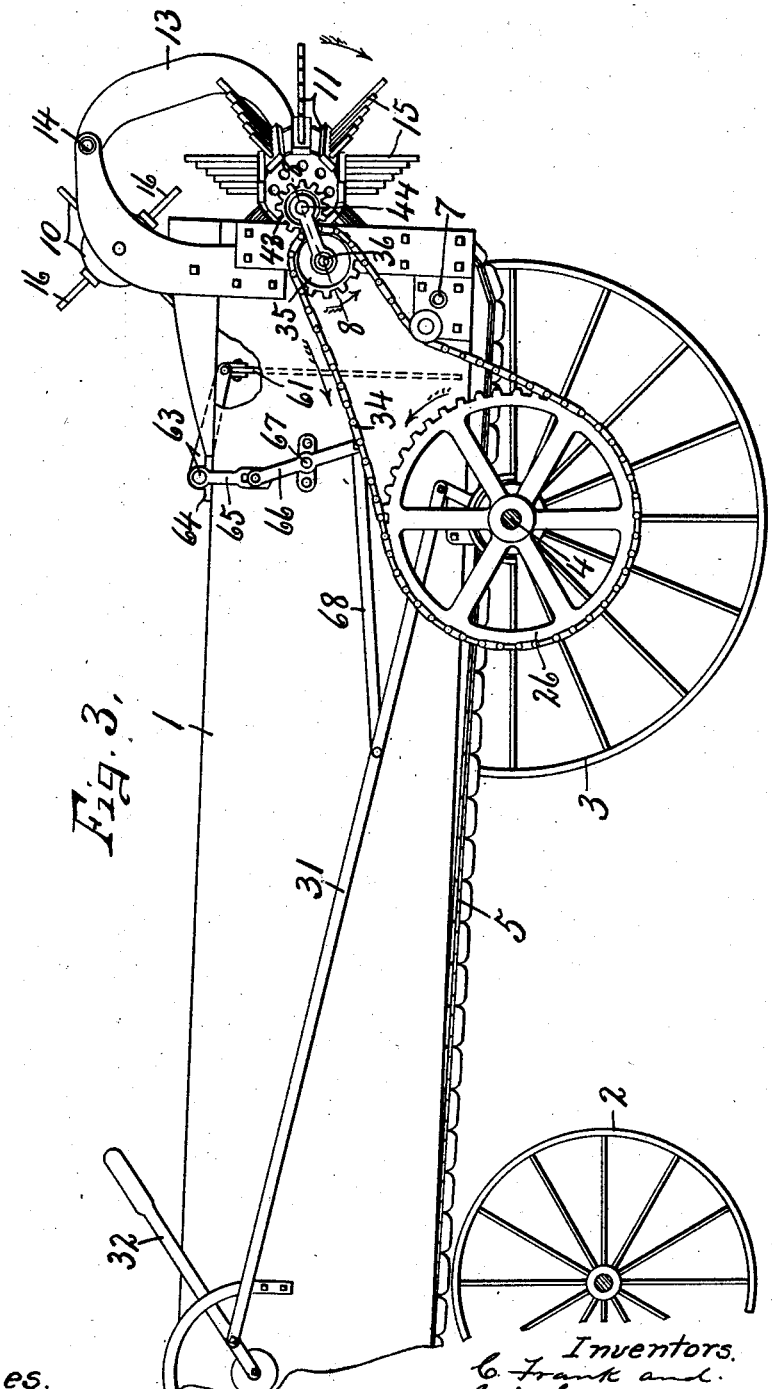

C. JOHNSON & C. FRANK.
MANURE SPREADER.
APPLICATION FILED MAY 31, 1911.
1,011,624.
Patented Dec. 12, 1911.
5 SHEETS—SHEET 4.
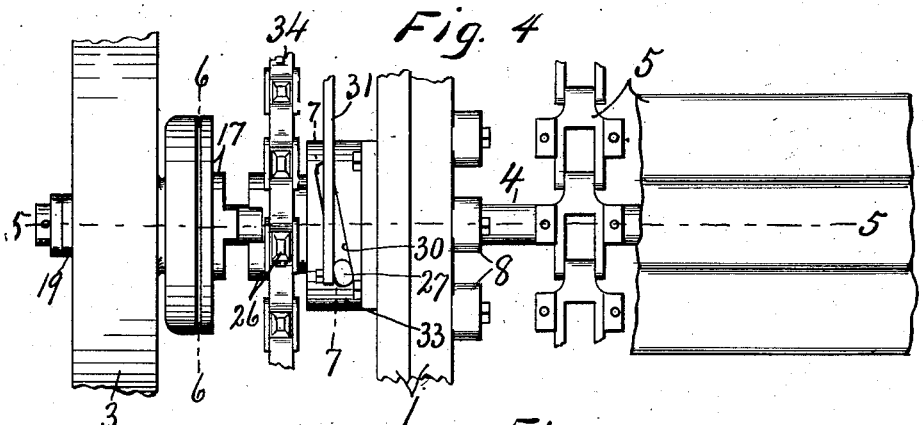
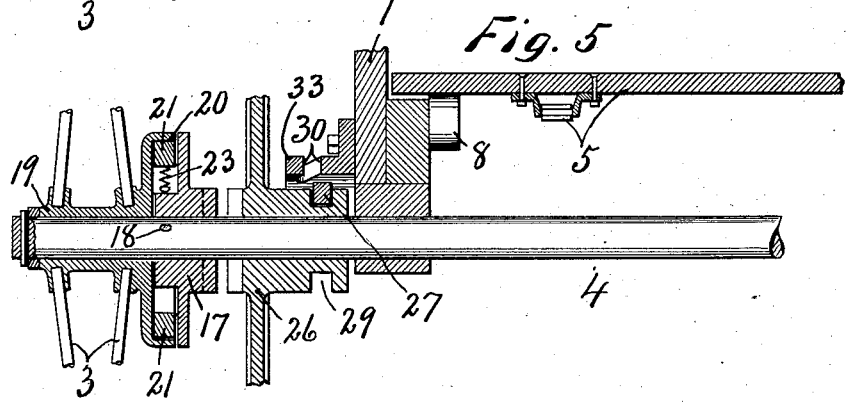
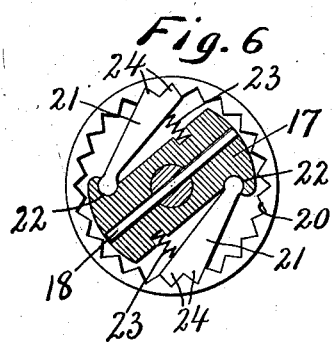
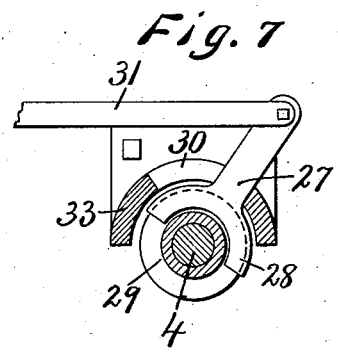
Witnesses.
Chas. E. Skelton.
H. E. Chase
Inventors
C. Frank and
C. Johnson
By Howard P. Denison
Atty.

C. JOHNSON & C. FRANK.
MANURE SPREADER.
APPLICATION FILED MAY 31, 1911.
1,011,624.
Patented Dec. 12, 1911.
5 SHEETS—SHEET 5.
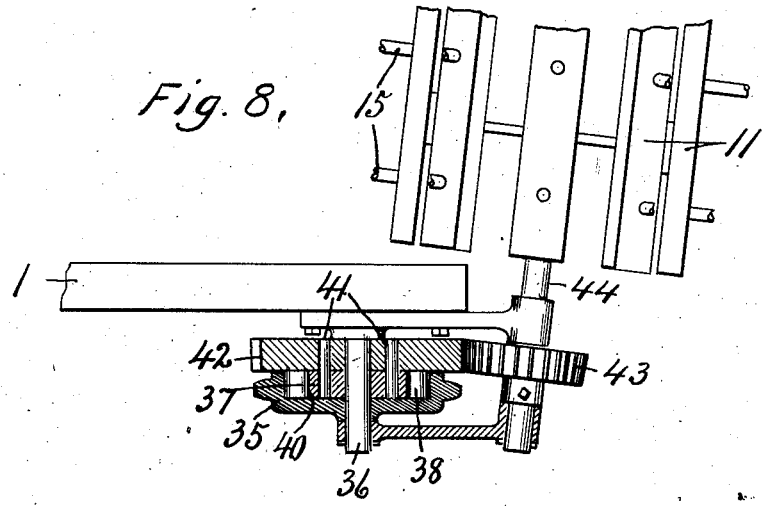
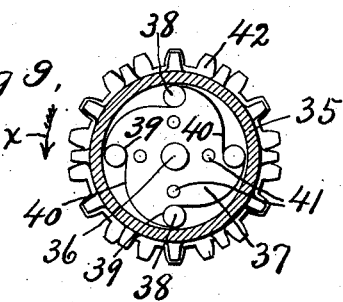
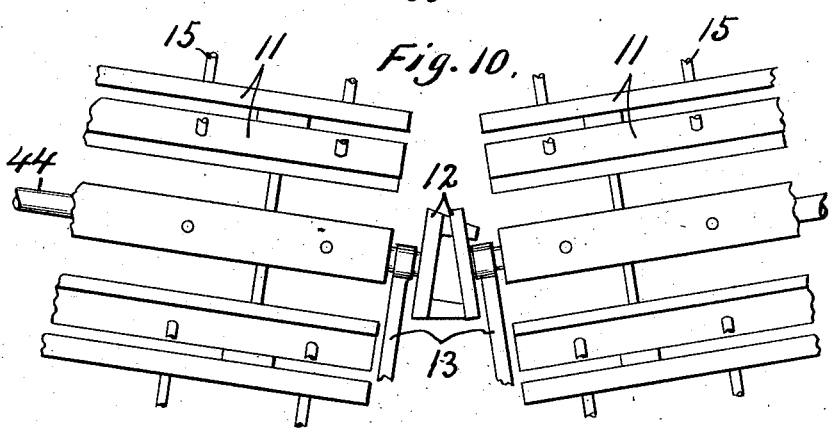
Witnesses
Chas. E. Shelton.
H. E. Chan
Inventors.
C. Frank and
C. Johnson
By Howard P. Davidson
Atty.

UNITED STATES PATENT OFFICE.

CHARLES JOHNSON, OF AUBURN, AND CHARLES FRANK, OF SENECA FALLS, NEW YORK.

MANURE-SPREADER.

1,011,624.      Specification of Letters Patent.     Patented Dec. 12, 1911.

Application filed May 31, 1911. Serial No. 630,298.

*To all whom it may concern:*

Be it known that we, CHARLES JOHNSON and CHARLES FRANK, of Auburn and Seneca Falls, respectively, in the counties of Cayuga and Seneca, respectively, in the State of New York, have invented new and useful Improvements in Manure-Spreaders, of which the following, taken in connection with the accompanying drawings, is a full, clear, and exact description.

This invention relates to certain improvements in manure spreaders of the class set forth in our pending application #497,773 filed May 22, 1909 in which the beater is located above and at the rear end of a traveling bed or apron (forming the bottom of the box) and is composed of sections connected end to end for simultaneous rotation with their axes disposed at an angle converging rearwardly to a line substantially coincident with the longitudinal center of the box for the purpose of distributing the manure laterally over a wider area than would be possible with the use of a beater of the same length revolving around a straight axis. It is found, however, that while this angular arrangement of the beater sections produces a relatively wide lateral distribution of the fertilizer as compared with the width of the box or traveling apron, the strip of land in line with the meeting ends of the sections is left practically unfertilized or at least with a very thin covering of the manure, and one of the objects of our present invention is to provide means for overcoming this difficulty and at the same time affording a wider and more uniform distribution of the fertilizer than has heretofore been practiced. In other words we have sought to provide means in the form of an additional beater for supplementing any deficiencies in the even distribution of the fertilizer by the sectional beaters.

Another object is to provide for the continued rotation of the beaters under their own momentum for the purpose of freeing themselves from the fertilizer and thereby obviating any liability of clogging of the machine when the latter is suddenly stopped.
A further object is to provide means whereby the end gate may be raised and lowered simultaneously with the locking and unlocking of the clutch between one of the traction wheels and initial driving element of the mechanism by which motion is transmitted from the traction wheel to the sectional beater.

Other objects and uses relating to specific parts of the machine will be brought out in the following description:

In the drawings—Figures 1, 2 and 3 are respectively a top plan and opposite side elevations of a manure spreader embodying the various features of our invention, the central portion of the machine of Fig. 1 and the front portion of Fig. 3 being broken away. Fig. 4 is an enlarged top plan of the clutch connections between one of the rear wheels and beater driving mechanism showing also a portion of the traveling apron and bearing rollers therefor. Fig. 5 is a vertical sectional view of the same mechanism taken on line 5—5, Fig. 4. Figs. 6 and 7 are transverse sectional views taken respectively on lines 6—6 and 7—7 Fig. 4, showing respectively the clutch connections between one of the rear wheels and axle and the shifting means for the clutch connection between the shaft and driving mechanism for the beater. Fig. 8 is an enlarged detail sectional view through the driving connections for one end of the sectional beater showing particularly the clutch by which the beater is driven and released under its own momentum. Fig. 9 is a transverse sectional view through the driving sprocket for the beater showing the coaxial clutch for driving and releasing the beater to act under its own momentum. Fig. 10 is a top plan of the universal coupling between the meeting ends of the beater sections.

This manure spreader comprises a main body or box —1— adapted to be mounted upon any suitable running gear having front steering wheels —2— and rear traction wheels —3—, the intent being to enable the spreader to be used in connection with the running gear of an ordinary farm wagon having a revoluble rear axle —4— upon which the traction wheels —3— are loosely mounted for independent relative rotation in one direction, as, for example, in backing up the spreader but are adapted to be locked to said shaft by suitable clutch mechanism under control of the operator as hereinafter more fully described.

The box —1— is provided with a movable bottom consisting of an endless bed or apron —5— carried by rotary drums —6— and —7— which are journaled in suitable bearings in the front and rear ends respectively of the box, while the opposite sides of the upper portion of the apron is supported and guided upon a series of roller bearings —8— on the adjacent sills of said box for the purpose of reducing friction incidental to the operation of the endless bed or apron.

A pair of rotary beaters —9— and —10— are mounted in suitable bearings upon the rear end of the box in different horizontal planes above that of the rear end of the apron, the beater —9— being composed of similar sections —11— arranged end to end at an angle with each other with their axes converging rearwardly to a point in a vertical plane substantially coincident with the longitudinal center of the box and traveling apron and are connected at their meeting ends by a universal joint or coupling —12— for transmitting rotary motion from one to the other in a manner somewhat similar to that shown in our pending application referred to except that the adjacent ends of the sections are supported in the lower forked end of a superposed bracket —13— having its upper end rigidly secured to a transverse rod or bar —14— which is rigidly secured to the sides of the main body or box —1—.

The beater sections —11— are provided with a series of rows of radially projecting pins —15— which gradually increase in length from their outer ends inwardly so as to travel in close proximity to the rear end of the apron and in line therewith. This relative angular arrangement of the beater sections —11— leaves a more or less open space between their meeting ends and causes the fertilizer to be thrown rearwardly and laterally from such space, thereby leaving the underlying portion of the ground unfertilized or at least with a very thin distribution of fertilizer, and in order that the fertilizer may be more evenly distributed across such space, we have provided the additional beater —10— which is arranged in a horizontal plane above that of the sectional beater —9— and apron —5— with its axis at substantially right angles to the sides of the box, said beater —10— being also provided with a series of rows of radial teeth or pins —16— to more effectively separate and distribute the fertilizer.

Although we have shown the straight beater —10— as located in a plane above the sectional beater —9—, it is evident that this order of arrangement may be reversed and that the length of the straight beater is immaterial except that it must extend across the gap between the meeting ends of the sectional beater.

*Beater driving mechanism.* — Suitable mechanism is provided for transmitting rotary motion from one of the traction wheels to the beaters and also to the apron and at the same time permitting the beaters to revolve under their own momentum sufficient to clear themselves from the fertilizer when the machine is suddenly stopped, and for this purpose a toothed clutch member —17— is rigidly secured by a pin —18— to the rear axle —4— in close proximity to the inner end of the hub —19— of the rear left-hand traction wheel —3—, said hub having its inner end provided with an enlarged annular flange formed with V-shaped ratchet teeth —20— for coöperative engagement with suitable pawls —21— on the outer end of the clutch member —17— as best seen in Figs. 5 and 6.

The inner ends of the pawls —21— are preferably cylindrical and are seated in corresponding sockets —22— on the adjacent end of the clutch member —17— with their pivotal axes substantially parallel with that of the shaft —4— so as to rock radially and are spring pressed into engagement with the internal ratchet teeth —20— by means of springs —23— as shown in Fig. 6. The outer end of each pawl is preferably provided with a pair of shoulders or biting ends —24— conforming to and adapted to engage two adjacent teeth at a time so as to obviate any liability of stripping the teeth when the motion of the ratchet wheel is opposed to the pawls.

The object of the ratchet wheel and pawls is to positively drive the shaft —4— when the machine is drawn forwardly and to allow the wheel to rotate independently of said shaft when the machine is backed up or propelled rearwardly, the rotation of the shaft being utilized for driving the beaters in a manner presently described. The opposite or inner end of the clutch member —17— is provided with clutch teeth or lugs adapted to be engaged by similar clutch teeth or lugs upon the hub of a sprocket wheel —26— which is loosely mounted upon the shaft or axle —4—. The sprocket wheel —26— is adapted to be moved axially into and out of locking engagement with the adjacent end of the clutch member —17— by means of a shifting lever —27— having an inner forked end —28— engaged in an annular groove —29— in the hub of the sprocket wheel —26— and its outer end engaged with a cam —30— and connected by a link —31— to a suitable hand lever —32— on the front end of the corresponding side of the box —1— as best seen in Figs. 3 and 7. The cam —30— is formed by cutting the diagonal slot in one side of a semi-circular hood or bracket —33— which is secured to the adjacent side of the box concentric with the axis of the axle —4—, the opposite sides of the slots forming cam surfaces by which the shifting member —27— is moved axially of the shaft —4— when rocked in reverse directions by means of the lever —32— and link —31—. This method of shifting the sprocket wheel —26— into and out of locking engagement with the clutch member —17— is particularly simple and effective, is operated with a minimum power and affords a positive lock of the clutch in its open or closed position.

The sprocket wheel is connected by a chain —34— to a sprocket idler —35— which is loosely journaled on a stud —36— on the rear end of the adjacent side of the box as best seen in Figs. 8 and 9 and is provided with an inner circular recess for receiving a toothed clutch member —37— and clutch rollers —38—. The clutch member —37— is provided on its periphery with a series of recesses —39— and cam faces —40— for forming bearings for the roller clutch members —38—, so that when the sprocket wheel —35— is rotated in the direction indicated by arrow *x*, Fig. 9, the rollers —38— will be operated to frictionally lock said sprocket wheel to the clutch member —37— to drive the beaters in a manner presently described, but when the sprocket wheel is suddenly stopped by the stopping of the machine, the clutch member —37— is free to continue to rotate under the momentum of the beater by reason of the fact that the rollers —38— will be forced to the lower points of the cam faces —40—. The clutch member —37— is locked by means of pins —41— to a coaxial gear —42— which is loosely mounted on the stud —36— in close proximity to the inner face of the sprocket —35— and clutch member —37— as clearly shown in Fig. 8. This gear —42— meshes with a pinion —43— which is rigidly secured to the adjacent end of a shaft —44— of one of the beater sections —11—, thereby imparting similar rotary motion to the other beater section through the medium of the universal coupling or connection —12—.

*Apron driving mechanism.*—The opposite or right hand end of the shaft of the beater —9— is provided with a pinion —45— meshing with a spur gear —46— which is loosely journaled upon a supporting stud —47— on the rear end of the adjacent side of the box as clearly shown in Figs. 1 and 2. The gear —46— is formed upon the periphery of a metal plate having a series of concentric rows of axially projecting teeth —48— for engagement by a sliding pinion —49—, thereby constituting a speed changing gear. The pinion —49— is splined upon an upwardly and rearwardly inclined shaft —50— which is journaled in suitable bearings upon the adjacent side of the box —1— and is provided with a worm —51— meshing with a worm gear —52—, the latter being rigidly secured to the shaft of the rear supporting drum —7— for the apron —5—. Any suitable means may be employed for shifting the pinion —49— into and out of engagement with any one of the series of concentric rows of teeth —48— for varying the speed of travel of the apron —5— and for this purpose we have shown a lever —53— which is fulcrumed upon the front end of the adjacent side of the box —1— and is connected by a link —54— to a yoke —55— on the pinion —49—.

*Driving mechanism for the auxiliary beater.*—The beater —10— may be rotated by any suitable power transmitting mechanism from one of the parts which are actuated by the traction wheel and for this purpose a pinion —56— and sprocket wheel —57— are loosely mounted coaxially upon a supporting stud or bearing —58— as best seen in Figs. 1 and 2, the pinion —56— meshing with the spur gear —46—, while the sprocket wheel —57— is connected by a chain —59— to a similar sprocket wheel —60— on the shaft of the beater —10—.

*Gate-operating mechanism.*—A gate —61— is movable vertically within the rear end of the box —1— just in front of the beaters —9— and —10— and for this purpose is mounted upon a transverse rod —62— having its ends supported on suitable crank arms or levers —63— which are journaled in bearings —64— on the opposite sides of the box —1— at or near the upper edges thereof. As shown in Figs. 1 and 3, the left hand crank arm —63— is provided with an additional slotted arm —65— which is connected with lost motion to one arm of an operating lever —66—, the latter being fulcrumed at —67— to the adjacent side of the box —1— and has its opposite arm connected by a link —68— to the clutch operating link —31— for the purpose of raising the end gate clear of the fertilizer when the clutches —26— and —17— are brought into interlocking engagement with each other to actuate the beaters and apron, it being understood that the gate will be forced to its closed position when these clutch members are disengaged.

The foregoing description is believed to be sufficiently clear and exact to enable any one skilled in the art to make and use the device, and while we have shown the auxiliary beater —10— as located in a plane above the sectional beater —9—, we do not wish to limit ourselves to such arrangement nor to the specific mechanisms for imparting rotary motion from one of the traction wheels to the beater and to the apron.

What we claim is:

1. In a manure spreader in combination with a box having a longitudinally movable bottom, a pair of rotary beaters disposed in planes one above the other and extending from side to side of the box, one of said beaters being composed of rearwardly inclined sections converging at a point approximately in the plane of the longitudinal center of the box and provided with bars arranged about and parallel with their respective axes, said bars having radially projecting teeth gradually increasing in length from their outer ends toward the center.

2. In a manure spreader in combination with a box having a longitudinally movable bottom, a pair of beaters disposed in planes one above the other and above the plane of the movable bottom and provided with lengthwise rows of radially projecting teeth arranged about their respective axes, one of said beaters being composed of rearwardly inclined sections having the teeth of each row gradually increasing in length from the outer ends toward the center of the beater, and means for rotating the beaters in the same direction whereby the teeth at adjacent sides of the beaters are caused to travel in opposite directions.

3. In a manure spreader in combination with a box having a longitudinally movable bottom, a pair of rotary beaters disposed in planes one above the other, the lower beater being composed of rearwardly inclined sections each having a plurality of lengthwise rows of radially projecting teeth gradually increasing in length from its outer toward its inner end so that the points of the teeth of each row at the front side of the beater will be substantially parallel with the axis of the other beater.

4. A manure spreader comprising coacting rotary beaters disposed in planes one above the other and provided with lengthwise rows of radially projecting teeth traveling in close proximity at adjacent sides of the beaters, one of the beaters being composed of rearwardly inclined sections coupled together by a universal joint and having the teeth of each of its rows gradually increasing in length from the outer end toward the inner end so that the points of all of the teeth will travel relatively close to those on the adjacent side of the other beater.

In witness whereof we have hereunto set our hands this 24 day of May 1911.

CHARLES JOHNSON.
CHARLES FRANK.

Witnesses:
L. A. PIERCE,
D. J. STRICKLAND.

Copies of this patent may be obtained for five cents each, by addressing the "Commissioner of Patents, Washington, D. C."